Aug. 30, 1966   E. K. KOPPELMANN   3,269,353
STEP MICROMETER ADJUSTMENT MEANS
Filed Aug. 26, 1964
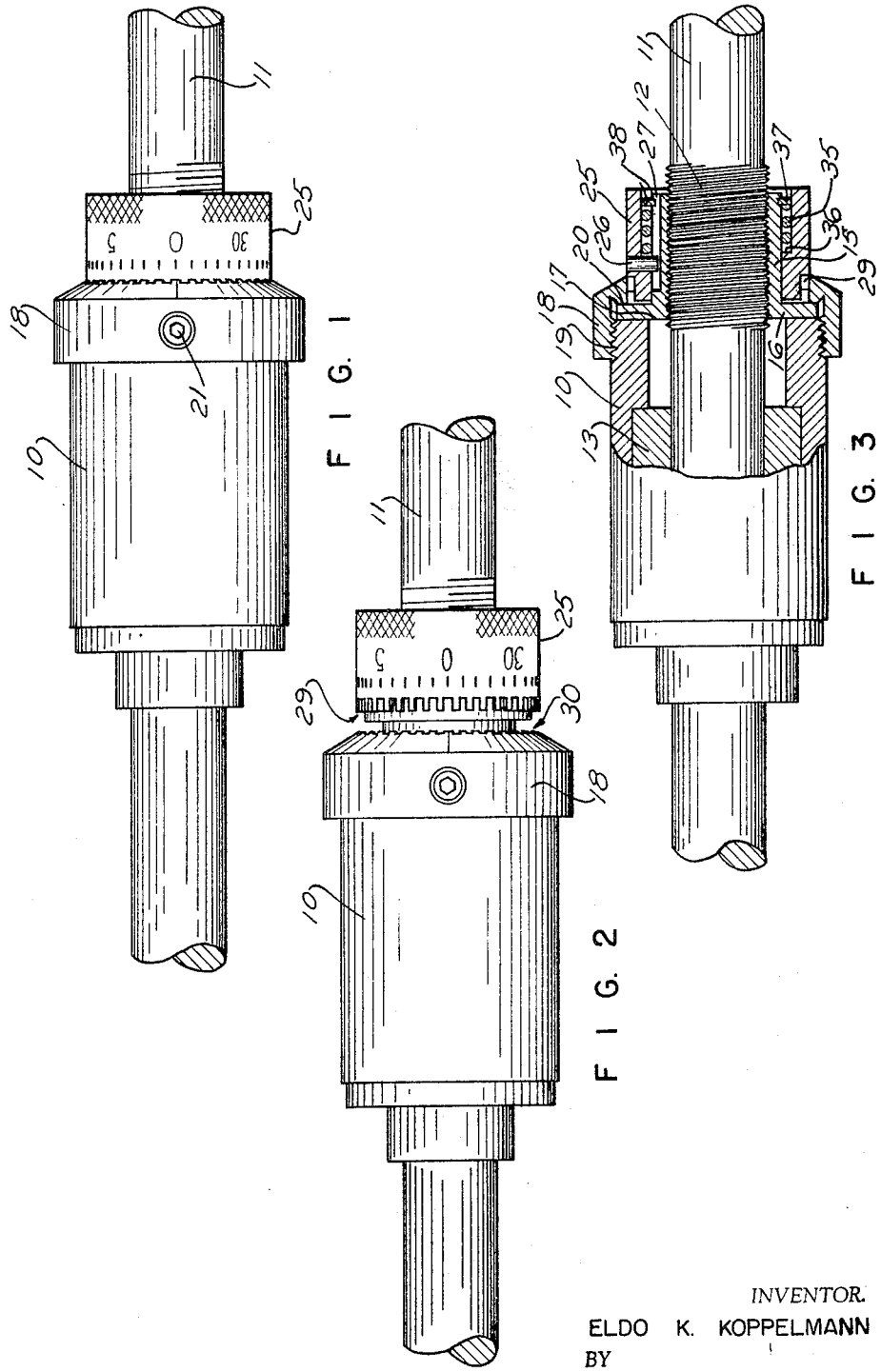
INVENTOR.
ELDO K. KOPPELMANN
BY
Barlow & Barlow
ATTORNEYS

United States Patent Office 3,269,353
Patented August 30, 1966

3,269,353
STEP MICROMETER ADJUSTMENT MEANS
Eldo K. Koppelmann, Cumberland, R.I., assignor to Madison Industries, Inc., a corporation of Rhode Island
Filed Aug. 26, 1964, Ser. No. 392,236
3 Claims. (Cl. 116—124)

In the machine tool industry, it is frequently desirable to provide axial adjustment of some part in step like fashion. Increments may vary depending upon the application but for ease in description shall be described herein as being in increments of one-thousandth of an inch. Typical uses for this type of adjustment are in cross slides of machine lathes and adjustment of such turning tools as recessing tools, countersinking tools and roller burnishing tools. In accordance with the general desires as outlined above, it is the principal object of this invention to provide an inexpensive micrometer type adjusting means for the class of goods broadly defined above, which will provide a positive lock for each incremental adjustment.

In the drawings:

FIG. 1 is an elevational view showing the adjustment means in engaged position;

FIG. 2 is a similar elevational view showing the adjustment means disengaged; and FIG. 3 is an elevational view partly in section and showing the adjustment means engaged as in FIG. 1.

In accordance with this invention the step adjustment device of this invention is shown as applied to a housing designated 10 through which a mandrel or shaft 11 is adapted to pass. The shaft or mandrel 11 is slidable axially in a bearing means 13 with relation to the housing 10 but is prevented from rotating by a keyway (not shown). To accomplish the movement of the shaft relative to the housing 10, the shaft is provided with threads as at 12 and an adjusting nut 15 having threads of the same pitch engage the threads 12 on the shaft. The adjusting nut 15 is provided with an end flange portion 16 which has a face 17 that abuts an end wall of the casing 10. To retain the adjusting nut in axial position, a locking collar 18 is provided, said collar having internal threads as at 19 which engage the complemental threaded portion on the body 10. The collar 18 is provided with an inturned flange portion as at 20 which flange portion engages the flange 16 of the nut to a tightness to prevent sloppiness of fit but yet provide rotational freedom of the nut 15 relative to the housing 10, the collar being retained in adjusted position by a set screw 21.

A sleeve 25 encircles the nut 15 and has a sliding fit therewith. The sleeve carries a pin 26 that is adapted to engage a keyway 27 on the nut 15 so that simultaneous rotation of the sleeve and nut may be had. The inner end wall of the lock sleeve is provided with a plurality of teeth as at 29, which teeth are adapted to engage similar teeth that are cut into the collar 18 as generally indicated at 30. An equal number of teeth is cut into the collar and sleeve, the geometric circle being divided into a finite number of parts, each part to represent one thousandth of an inch for example. Assuming that the collar and the sleeve each have 35 teeth cut therein, 35-thousandths would then be represented for one complete revolution of the lock sleeve relative to the collar. When this rotation is properly related to the pitch as represented on the threads 12, it is possible to obtain in linear movement of the shaft 11 a distance corresponding to the 35-thousandths of one inch for a complete rotation of the lock sleeve.

As has been mentioned before the lock sleeve is slidably related to the nut 15 in the axial direction. Under normal conditions, the nut is engaged with the collar 18 and this engagement is provided by means of a resilient spring 35 which abuts a wall 36 in the enlarged spring receiving bore of the sleeve 25, the other end of the spring engaging a split ring 37 that is received in a groove 38 in the nut 15. As viewed in FIGS. 1 and 3, the lock sleeve is engaged with the collar such that rotational as well as axial movement of the shaft 11 relative to the body 10 is prevented. Should it be desired to adjust the position of the shaft 11 relative to the body 10, it is merely necessary to withdraw the locking sleeve 25 from engagement with the collar 18 by axially pulling the sleeve away from the collar as shown in FIG. 2, thus compressing the spring 35. Rotation of the sleeve 25 and the nut 15 may then be had in unison which will re-adjust the position of the shaft 11 relative to the body 10, the nut being retained in position by virtue of the flange 16 being axially retained by the collar 18. When sufficient adjustment is had, the sleeve 25 will be resiliently returned to a point where engagement of the teeth 29 and 30 is had thus preventing any further rotation of the nut 15.

I claim:

1. An axial adjustment means for a shaft passing through a body member, comprising a set of threads on said shaft, a nut threadingly received on said shaft, means retaining said nut in axial position relative to said body member but with rotational freedom, a sleeve encircling said nut, said sleeve being rotationally coupled to said nut and lock means on said sleeve to prevent rotational movement thereof.

2. An axial adjustment means as in claim 1 wherein said sleeve is movable axially of said nut and said lock means axially engage the body member.

3. A positive lock axial adjusting means for use with a shaft passing through a main body, said shaft being adapted to be adjusted relative to said main body, comprising a set of threads on said shaft, a nut threadingly received on said shaft, said nut being provided with a peripheral flange, said flange being adapted to abut said body, a collar having an inturned end, the inturned end of said collar holding said flange against said main body, an adjusting sleeve, said adjusting sleeve keyed to said nut for axial movement relative thereto but for rotative movement in common therewith, said sleeve having a plurality of teeth at one end thereof, said collar having a plurality of corresponding teeth, the teeth of said collar and said sleeve normally engaging, and resilient means holding the teeth of said sleeve and said collar in engagement.

No references cited.

FRANK SUSKO, *Primary Examiner.*

L. H. GERIN, *Assistant Examiner.*